US009334931B2

(12) United States Patent
Yamaguchi et al.

(10) Patent No.: US 9,334,931 B2
(45) Date of Patent: May 10, 2016

(54) BELT DRIVE MECHANISM, BELT DRIVE APPARATUS, AND PULLEY

(71) Applicant: KYOCERA DOCUMENT SOLUTIONS INC., Osaka (JP)

(72) Inventors: Akihiro Yamaguchi, Osaka (JP); Masahiro Ueno, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 128 days.

(21) Appl. No.: 14/185,676

(22) Filed: Feb. 20, 2014

(65) Prior Publication Data

US 2014/0235392 A1    Aug. 21, 2014

(30) Foreign Application Priority Data

Feb. 21, 2013  (JP) ................. 2013-031644

(51) Int. Cl.
| | | |
|---|---|---|
| F16H 7/00 | (2006.01) | |
| F16H 55/36 | (2006.01) | |
| F16H 55/48 | (2006.01) | |
| F16H 7/02 | (2006.01) | |
| G03G 21/16 | (2006.01) | |
| G03G 15/00 | (2006.01) | |

(52) U.S. Cl.
CPC .............. *F16H 7/02* (2013.01); *G03G 21/1647* (2013.01); *G03G 15/757* (2013.01); *G03G 2221/1654* (2013.01)

(58) Field of Classification Search
CPC ......... G03G 15/757; F16H 7/02; F16H 55/38; F16G 1/20; B21D 53/14
USPC .......................................... 474/166, 142, 190
See application file for complete search history.

(56) References Cited

U.S. PATENT DOCUMENTS

| | | | | | |
|---|---|---|---|---|---|
| 2,593,158 | A | * | 4/1952 | Lorig .................... | B65H 27/00 193/37 |
| 2,673,470 | A | * | 3/1954 | Cosmos ................. | F16H 55/48 152/323 |
| 3,126,626 | A | * | 3/1964 | Woods et al. ......... | B21D 53/14 474/272 |
| 3,208,296 | A | * | 9/1965 | Baermann ............. | F16G 1/00 252/62.53 |
| 3,208,297 | A | * | 9/1965 | Barta ..................... | F16G 1/20 474/272 |
| 3,273,001 | A | * | 9/1966 | Baermann ............. | H02K 57/003 206/818 |

(Continued)

FOREIGN PATENT DOCUMENTS

| | | |
|---|---|---|
| JP | S60-7455 U | 1/1985 |
| JP | H05-157155 A | 6/1993 |

(Continued)

OTHER PUBLICATIONS

An Office Action; Notice of Reasons for Rejection, issued by the Japanese Patent Office on Apr. 14, 2015, which corresponds to Japanese Patent Application No. 2013-031644 and is related to U.S. Appl. No. 14/185,676.

*Primary Examiner* — Henry Liu
(74) *Attorney, Agent, or Firm* — Studebaker & Brackett PC

(57) ABSTRACT

A belt drive mechanism includes a plurality of pulleys and a belt made from a metal material and wound around the plurality of pulleys. Around the entire circumference of an outer peripheral surface of at least one of the plurality of pulleys, a swelling portion is formed to swell outward in a radial direction of the pulley. The swelling portion includes a first part having a larger swelling amount and a second part having a smaller swelling amount, the first part having a larger linear expansion coefficient than the second part.

8 Claims, 6 Drawing Sheets

(56) References Cited

U.S. PATENT DOCUMENTS

| | | | | |
|---|---|---|---|---|
| 3,478,609 | A * | 11/1969 | Beindorf | F16H 7/02 474/142 |
| 4,838,842 | A * | 6/1989 | Ohkata | F16H 55/38 428/148 |
| 4,913,689 | A * | 4/1990 | Morishita | B21H 1/04 474/170 |
| 5,181,888 | A * | 1/1993 | Takahashi | G03G 15/755 474/101 |
| 5,214,472 | A * | 5/1993 | Czuprynski | F16G 1/20 399/162 |
| 5,399,127 | A * | 3/1995 | Foley | F16G 1/20 474/270 |
| 5,418,600 | A * | 5/1995 | Genovese | F16H 7/02 399/167 |
| 5,427,581 | A * | 6/1995 | McGrath | F16H 7/1254 474/101 |
| 7,780,556 | B2 * | 8/2010 | Sakanaka | F16G 5/16 474/174 |
| 8,406,665 | B2 * | 3/2013 | Hirose | G03G 15/0131 198/835 |
| 8,559,851 | B2 * | 10/2013 | Konishi | F16H 7/02 399/167 |
| 8,834,308 | B2 * | 9/2014 | Lin | F16H 7/08 400/545 |
| 2011/0033206 | A1 * | 2/2011 | Kitayama | G03G 15/757 399/167 |
| 2014/0064752 | A1 * | 3/2014 | Tsuji | G03G 15/55 399/36 |
| 2014/0235384 | A1 * | 8/2014 | Yamaguchi | G03G 15/757 474/93 |

FOREIGN PATENT DOCUMENTS

| | | |
|---|---|---|
| JP | 2011-118326 A | 6/2011 |
| JP | 2011-248303 A | 12/2011 |

* cited by examiner

BELT DRIVE MECHANISM, BELT DRIVE APPARATUS, AND PULLEY

INCORPORATION BY REFERENCE

The present application claims priority under 35 U.S.C. §119 to Japanese Patent Application No. 2013-031644, filed Feb. 21, 2013. The contents of this application are incorporated herein by reference in their entirety.

BACKGROUND

The present disclosure relates to belt drive mechanisms, belt drive apparatuses, and pulleys.

Examples of belt drive apparatuses including a belt drive mechanism may include printers and multifunction peripherals. A printer or a multifunctional peripheral includes a photosensitive drum that is driven and rotated and a belt drive mechanism that drives and rotates the photosensitive drum. The belt drive mechanism is a rotation transmitting mechanism for transmission of rotational drive force. The belt drive mechanism includes, for example, a drive pulley, a driven pulley, and an endless belt wound between the drive pulley and the driven pulley. It is known that the belt of the belt drive mechanism is made from a metal material having high rigidity.

Further, a technique to control inclination of a pulley that supports the belt for reduction in belt meandering has been known.

SUMMARY

A belt drive mechanism according to one mode of the present disclosure includes a plurality of pulleys and a belt made from a metal material and wound around the plurality of pulleys. At least one of the plurality of pulleys has an outer peripheral surface around the entire circumference of which a swelling portion is formed to swell outward in a radial direction of the pulley. The swelling portion includes a first part having a larger swelling amount and a second part having a smaller swelling amount, the first part having a larger linear expansion coefficient than the second part.

A belt drive apparatus according to another mode of the present disclosure includes a belt drive mechanism. The belt drive mechanism includes a plurality of pulleys and a belt made from a metal material and wound around the plurality of pulleys. At least one of the plurality of pulleys has an outer peripheral surface around the entire circumference of which a swelling portion is formed to swell outward in a radial direction of the pulley. The swelling portion includes a first part having a larger swelling amount and a second part having a smaller swelling amount, the first part having a larger linear expansion coefficient than the second part.

A pulley according to still another mode of the present disclosure is a pulley having an outer peripheral surface around which a belt is wound. A swelling portion is formed on the outer peripheral surface to swell outward in a radial direction of the pulley. A part of the swelling portion which has a larger swelling amount has a larger linear expansion coefficient than a part of the swelling portion which has a smaller swelling amount.

DETAILED DESCRIPTION

Embodiments of the present disclosure will be described in detail below with reference to the accompanying drawings. It is noted that the present disclosure is not limited to the following embodiments.

Figure 1:
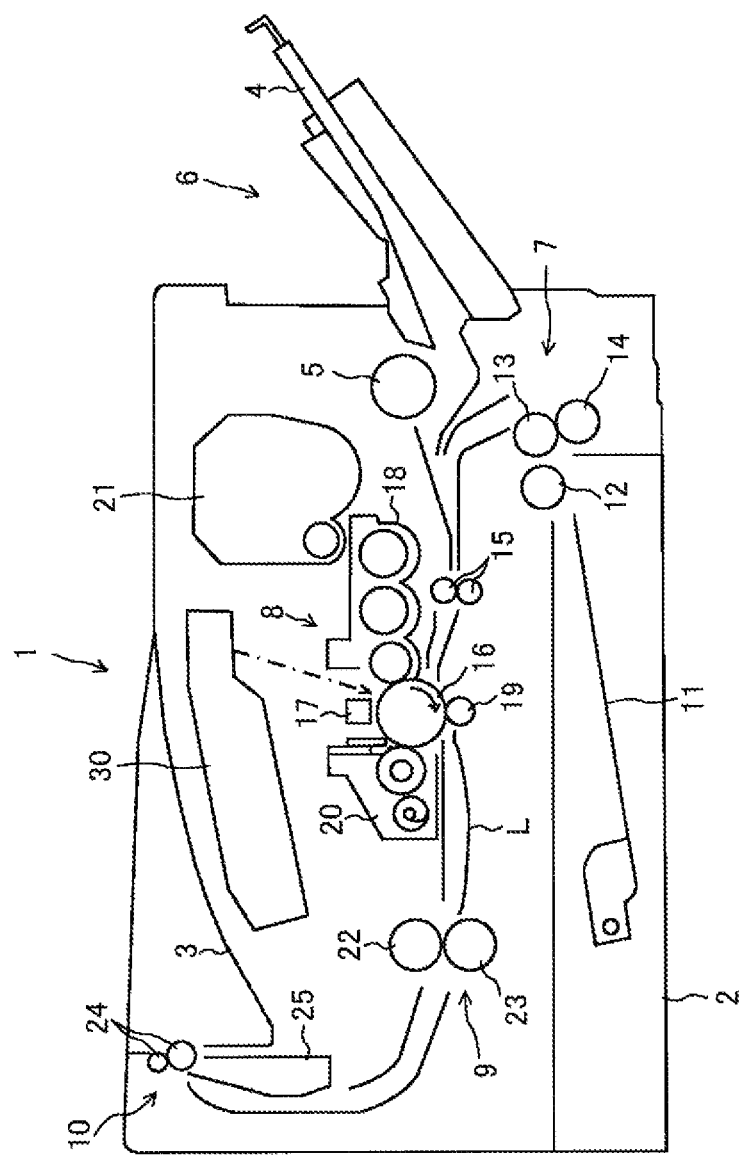
FIG. 1 is a cross sectional view showing a schematic configuration of a laser printer as a belt drive apparatus according to one embodiment.

FIG. 1 is a cross sectional view showing a schematic configuration of a laser printer 1 as a belt drive apparatus according to the present embodiment.

The laser printer 1 includes, as shown in FIG. 1, a box-shaped printer main body 2, a manual paper feed section 6, a cassette paper feed section 7, an image forming section 8, a fusing section 9, and a paper ejection section 10. The laser printer 1 forms an image on paper on the basis of image data transmitted from a terminal (not shown) or the like, while conveying the paper along a conveyance path L in the interior of the printer main body 2.

The manual paper feed section 6 includes a manual feed tray 4 and a paper feed roller 5 for manual paper feed.

The cassette paper feed section 7 is disposed at the bottom of the printer main body 2. The cassette paper feed section 7 includes a paper feed cassette 11, a pickup roller 12, a paper feed roller 13, and a retard roller 14.

The image forming section 8 is arranged above the cassette paper feed section 7 in the interior of the printer main body 2. The image forming section 8 includes a photosensitive drum 16, a charger 17, a development section 18, a transfer roller 19, a cleaner 20, a laser scanning unit (LSU) 30, and a toner hopper 21. A belt drive mechanism 40 drives and controls the photosensitive drum 16. The image forming section 8 forms an image on paper supplied from the manual paper feed section 6 or the cassette paper feed section 7.

It is noted that a pair of registration rollers 15 is provided in the conveyance path L.

The fusing section 9 is arranged beside the image forming section 8, that is, on the downstream side of the conveyance path L. The fusing section 9 includes a fusing roller 22 and a pressure roller 23, which are in press contact with each other to rotate. The fusing section 9 fuses a toner image, which is transferred to paper by the image forming section 8, to the paper.

The paper ejection section 10 is arranged above the fusing section 9. The paper ejection section 10 includes an exit tray 3, a pair of paper delivery rollers 24, and a plurality of conveyance guide ribs 25. The exit tray 3 is formed in the upper part of the printer main body 2 to have a recessed shape.

When the laser printer 1 receives image data, the photosensitive drum 16 is driven and rotated in the image forming section 8. Then, the charger 17 charges the surface of the photosensitive drum 16.

Thereafter, laser light is emitted on the basis of the image data from the laser scanning unit 30 to the photosensitive drum 16. Irradiation of the laser light forms an electrostatic latent image on the surface of the photosensitive drum 16. The development section 18 develops the electrostatic latent image formed on the photosensitive drum 16, so that the electrostatic latent image becomes visible as a toner image.

Thereafter, the transfer roller 19 presses the paper against the surface of the photosensitive drum 16. This transfers the toner image on the photosensitive drum 16 to the paper. The fusing roller 22 and the pressure roller 23 of the fusing section 9 respectively apply heat and pressure to the paper to which the toner image is transferred. This results in fusing of the toner image to the paper.

Figure 2:
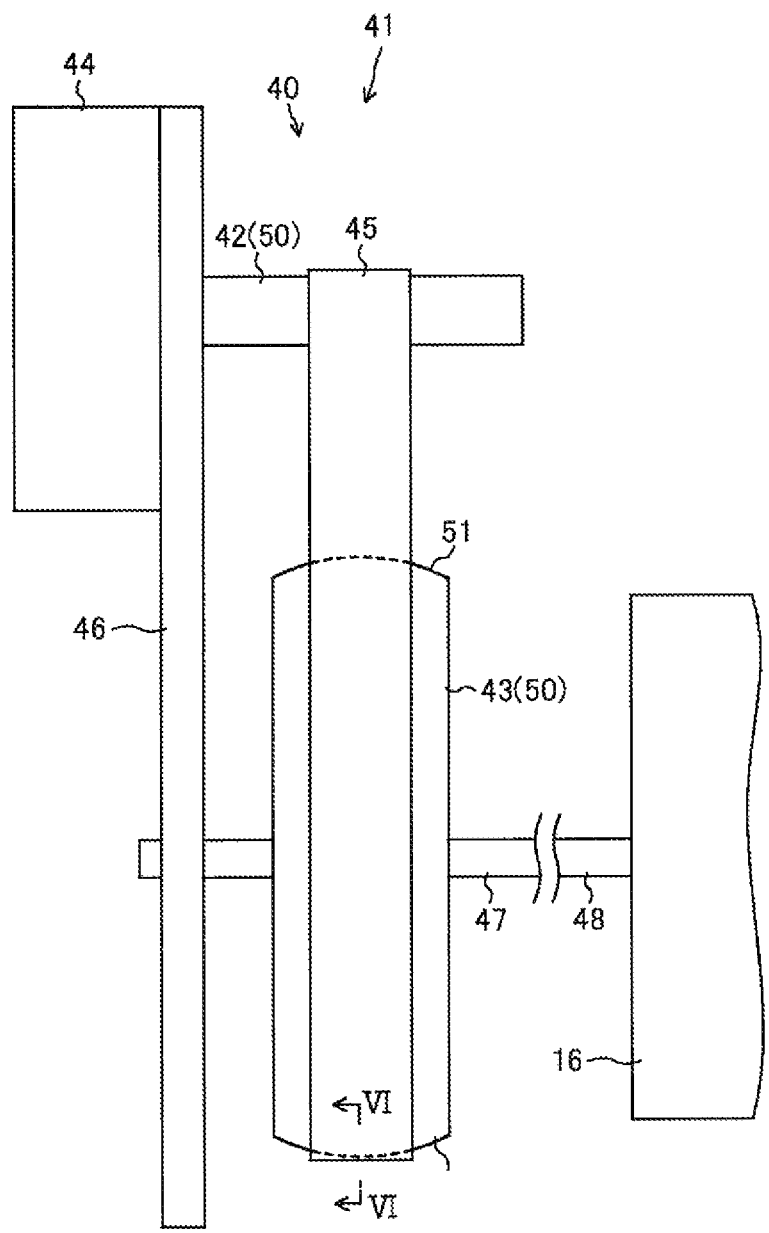
FIG. 2 is a front view of the belt drive mechanism according to the embodiment.
Figure 3:
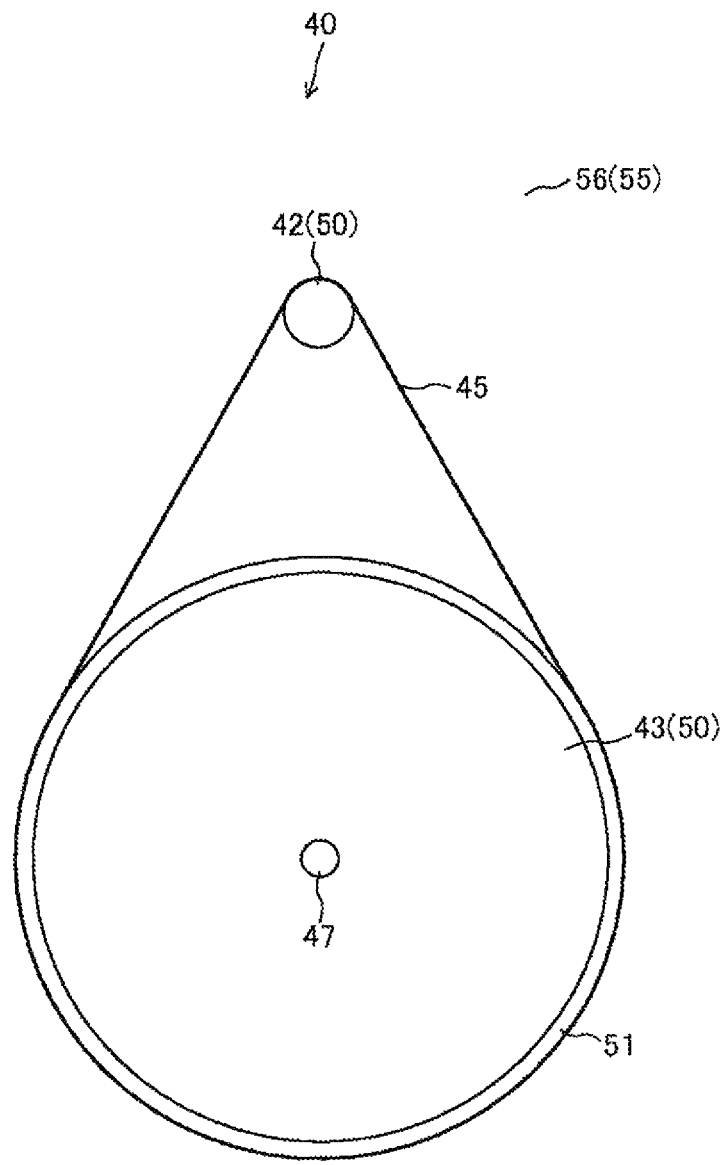
FIG. 3 is a side view of the belt drive mechanism according to the embodiment.

The belt drive mechanism 40 provided in the laser printer 1 will be discussed next. FIG. 2 is a front view of the belt drive mechanism 40 according to the present embodiment. FIG. 3 is a side view of the belt drive mechanism 40 according to the present embodiment.

As shown in FIGS. 2 and 3, the belt drive mechanism 40 includes a plurality of pulleys 50 and an endless belt 45 wound around the pulleys 50.

The pulleys 50 include a drive pulley 42 and a driven pulley 43, for example. The belt drive mechanism 40 of the present embodiment includes a single drive pulley 42 and a single driven pulley 43.

The belt drive mechanism 40 includes a motor 44. The motor 44 drives and rotates the drive pulley 42. The motor 44 is held by a holding member 46. Further, the holding member 46 supports an output shaft (not shown) of the motor 44 rotatably.

The drive pulley 42 is connected and fixed to the output shaft of the motor 44. For example, the drive pulley 42 is made from a metal material. By contrast, the driven pulley 43 is made from a hard resin that can withstand sliding on metal.

The driven pulley 43 includes an output shaft 47. The output shaft 47 is a rotary shaft of the driven pulley 43. The holding member 46 supports one end of the output shaft 47 rotatably. On the other hand, a shaft member 48 of the photosensitive drum 16 is connected to the other end of the output shaft 47.

The drive force of the motor 44 is transmitted to the photosensitive drum 16 through the drive pulley 42, the belt 45, the driven pulley 43, the output shaft 47 of the driven pulley 46, and the shaft member 48 of the photosensitive drum 16. Thus, the photosensitive drum 16 is belt-driven and controlled by the belt drive mechanism 40.

Here, the belt 45 is made from a metal material. Preferably, the belt 45 may be made from martensitic or austenitic stainless steel, for example.

Figure 4:
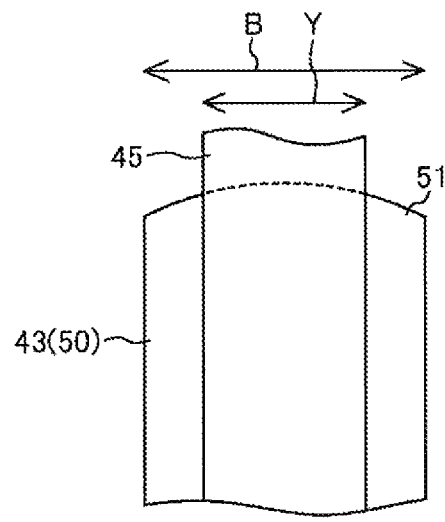
FIG. 4 is a diagram showing a driven pulley according to a first aspect.

FIG. 4 is a diagram showing a driven pulley 43 according to a first aspect. FIG. 4 is a partially enlarged front view of the driven pulley 43. As shown in FIG. 4, the belt drive mechanism 40 according to the present embodiment is configured so that a width Y of the belt 45 and a width B of the outer peripheral surface of at least one of the pulleys 50 satisfy the relational expression, $Y \geq 0.5 B$. That is, the width Y of the belt 45 is equal to or larger than a half of the width B of the outer peripheral surface of at least one of the pulleys 50 in the belt drive mechanism 40 according to the present embodiment. It is noted that although FIG. 4 shows the driven pulley 43 as one example, the drive pulley 42 may be configured also to satisfy the relational expression, $Y \geq 0.5 B$.

Around the entire circumference of the outer peripheral surface of at least one of the plurality of pulleys 50, a swelling portion 51 is formed to swell outward in the radial direction of the pulley 50. In the present embodiment, the swelling portion 51 is formed on the outer peripheral surface of the driven pulley 43. The swelling portion 51 of the driven pulley 43 according to the first aspect is formed across the entirety of the outer peripheral surface of the driven pulley 43 in the width direction. Hereinafter, the radial direction of the one pulley 50 is referred to as a "pulley radial direction", while the width direction of the outer peripheral surface of the one pulley 50 is referred to as a "pulley width direction".

Figure 5:
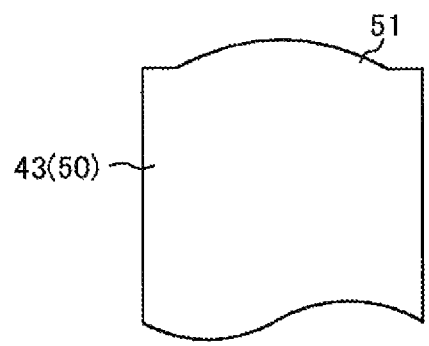
FIG. 5 is a diagram showing a driven pulley according to a second aspect.

FIG. 5 is a diagram showing a driven pulley 43 according to a second aspect. As shown in FIG. 5, the swelling portion 51 of the driven pulley 43 according to the second aspect is formed at a part of, for example, at the central part of the driven pulley 43 in the pulley width direction.

Figure 6:
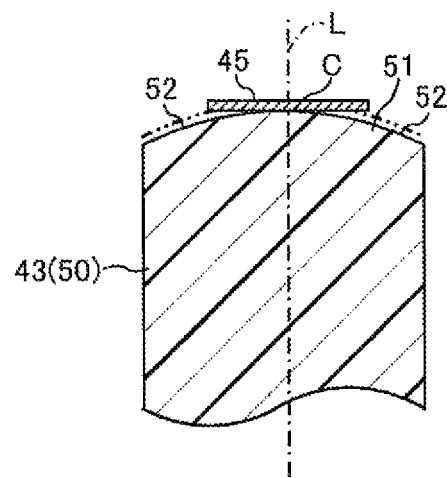
FIG. 6 is a cross sectional view taken along the line VI-VI in FIG. 2.

FIG. 6 is a cross sectional view taken along the line VI-VI in FIG. 2. The driven pulley 43 shown in FIG. 6 is the driven pulley 43 according to the first aspect. As shown in FIG. 6, the swelling portion 51 of the driven pulley 43 according to the first aspect is in a crown shape as one example. The crown shape of the swelling portion 51 is such that the swelling amount thereof gradually reduces as it goes to the opposite end parts from the central part of the swelling portion 51 in the pulley width direction (right and left directions in FIG. 6). In other words, the crown shape of the swelling portion 51 is a convex shape in which the central part of the swelling portion 51 in the pulley width direction swells outward in the pulley radial direction when compared with the opposite end parts thereof. That is, the central part of the swelling portion 51 in the pulley width direction is a part having a larger swelling amount in the driven pulley 43 according to the first aspect. On the other hand, each opposite end part of the swelling portion 51 in the pulley width direction is a part having a smaller swelling amount. It is noted that the part having a larger swelling amount is a part all or part of which has a maximum swelling amount in the swelling portion 51. On the other hand, each part having a smaller swelling amount is a part all or part of which has a minimum swelling amount in the swelling portion 51. When viewed in cross section in the pulley radial direction, the crown shape of the swelling portion 51 is an arc shape that swells outward in the pulley radial direction. It is noted that the swelling portion 51 of the driven pulley 43 according to the second aspect has the same crown shape as the swelling portion 51 of the driven pulley 43 according to the first aspect, as shown in FIG. 5. That is, the central part of the swelling portion 51 in the pulley width direction is the part having a larger swelling amount also in the driven pulley 43 according to the second aspect. On the other hand, each opposite end part of the swelling portion 51 in the pulley width direction is the part having a smaller swelling amount.

Figure 7:
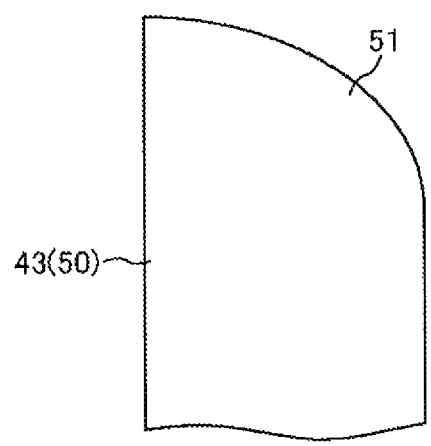
FIG. 7 is a diagram showing a driven pulley according to a third aspect.

It is noted that the shape of the swelling portion 51 is not limited to the shape as shown in FIG. 6. In one example, as shown in FIG. 7, the shape of the swelling portion 51 may be such that the swelling amount thereof gradually reduces as it goes from one end part to the other end part (e.g., left end to right end in FIG. 7) of the swelling portion 51 in the pulley width direction. That is, one end part (e.g., left end part) of the swelling portion 51 in the pulley width direction corresponds to the part having a larger swelling amount in the driven pulley 43 according to a third aspect shown in FIG. 7. On the other hand, the other end part (e.g., right end part) of the swelling portion 51 in the pulley width direction corresponds to the part having a smaller swelling amount.

As shown in FIG. 6, a coated portion 52 is formed on, for example, each part of the swelling portion 51 which has a smaller swelling amount. Specifically, in the case of the driven pulley 43 according to the first aspect, the coated portion 52 is formed on each opposite end part (region indicated by the dashed and double dotted lines in FIG. 6) of the swelling portion 51 in the pulley width direction. Thus, the coefficient of linear expansion in the pulley radial direction of the swelling portion 51 (hereinafter it may be referred to merely as a "linear expansion coefficient") is larger in the central part than in the opposite end parts of the swelling portion 51 in the pulley width direction. That is, the linear expansion coefficient of the part of the swelling portion 51 which has a larger swelling amount is larger than that of each part thereof which has a smaller swelling amount. Each coated portion 52 may be formed by performing surface treatment to increase thermal resistance (e.g., fluorine coating) on the resin that forms a base material of the driven pulley 43, for example. It is noted that the surface treatment is not limited to fluorine coating and may be Teflon coating, for example. When viewed in cross section in the pulley radial direction, the coated portions 52 are line symmetrical with respect to an imaginary line L passing through the center of the swelling portion 51 in the pulley width direction.

As described above, the belt drive mechanism 40 of the present embodiment includes two pulleys of the drive pulley 42 and the driven pulley 43. Around the entire circumference of the outer peripheral surface of the driven pulleys 43, the swelling portion 51 is formed to swell outward in the pulley radial direction. The swelling portion 51 is formed so that the amount of outward swelling in the pulley radial direction is larger in the central part than each opposite end part in the pulley width direction.

With this configuration, the swelling portion 51 can restrict movement of the belt 45 in the pulley width direction in running.

That is, the belt 45 wound around the driven pulley 43 comes in contact with the part of the swelling portion 51 which has the largest swelling amount, that is, its central part in the pulley width direction in the driven pulley 43 according to each of the first and second aspects. When the belt 45 moves in the pulley width direction in running, frictional heat is generated at a contact part C (see FIG. 6) between the part of the swelling portion 51 which has a larger swelling amount and the belt 45. This can cause thermal expansion to allow the part of the swelling portion 51 which has a larger swelling amount to swell outward in the pulley radial direction. Thus, the swelling portion 51 can swell more to restrict movement of the belt 45 in the pulley width direction.

Further, the linear expansion coefficient of the part of the swelling portion 51 which has a larger swelling amount is larger than that of each part thereof which has a smaller swelling amount in the present embodiment. That is, the coefficient of linear expansion in the pulley radial direction of the swelling portion 51 is larger in the central part than in the opposite end parts of the swelling portion 51 in the pulley width direction in the driven pulley 43 according to each of the first and second aspects. Accordingly, when the belt 45 moves in the pulley width direction in running, the amount of thermal expansion in the part of the swelling portion 51 which has a larger swelling amount is larger than that in the part thereof which has a smaller swelling amount. This can further promote swelling of the swelling portion 51. Thus, the swelling portion 51 can reliably restrict the movement of the belt 45 in the pulley width direction, thereby reducing belt meandering.

Further, in the present embodiment, the coated portion 52 is formed on each part of the swelling portion 51 which has a smaller swelling amount, that is, each opposite end part of the driven pulley 43 in the pulley width direction according to each of the first and second aspect. The coated portion 52 may be formed by performing surface treatment to increase thermal resistance, for example, fluorine coating on a resin that forms a base material of the driven pulley 43, for example.

With this configuration, the part of the swelling portion 51 which has a smaller swelling amount is coated (covered) with fluororesin excellent in thermal resistance. Accordingly, the linear expansion coefficient of the part of the swelling portion 51 which has a larger swelling amount is larger than that of each part thereof which has a smaller swelling amount. That is, the coefficient of linear expansion in the pulley radial direction of the swelling portion 51 is larger in the central part than in each opposite end part of the swelling portion 51 in the pulley width direction in the driven pulley 43 according to each of the first and second aspects. With this configuration, only surface treatment performed on the surface of the base material of the driven pulley 43 can result in the swelling portion 51 in which the linear expansion coefficient of the part having a larger swelling amount is larger than that of each part having a smaller swelling amount. Thus, the configuration can be simplified, and cost reduction can be achieved when compared with the case where the base material of the driven pulley 43 includes a plurality of resins different from each other in linear expansion coefficient.

Moreover, the swelling portion 51 is formed on the outer peripheral surface of the driven pulley 43 of the plurality of pulleys 50 and is not formed on the outer peripheral surface of the drive pulley 42 in the present embodiment. This is because meandering of the belt 45 is more liable to be caused in the driven pulley 43 than in the drive pulley 42.

As described above, formation of the swelling portion 51 only on the outer peripheral surface of the driven pulley 43, in which meandering of the belt 45 is liable to be caused, can achieve cost reduction and reliable reduction in meandering of the belt 45 when compared with the case where the swelling portion 51 is formed on the outer peripheral surface of each of the drive pulley 42 and the driven pulley 43.

Moreover, the belt drive mechanism 40 according to the present embodiment is configured so that the width Y of the belt 45 and the width B of the outer peripheral surface of the driven pulley 43 satisfy the relational expression, $Y \geq 0.5$ B. This can ensure a sufficient area of the contact part between the belt 45 and the swelling portion 51 of the driven pulley 43. Thus, moderate frictional heat (to the extent that the peripheral length of the belt 45 varies no so much) can be generated at the contact part between the belt 45 and the swelling portion 51 when the belt 45 moves in the pulley width direction in running. Accordingly, the frictional heat can promote swelling of the swelling portion 51 to restrict movement of the belt 45 in the pulley width direction.

Further, the laser printer 1 includes the belt drive mechanism 40. Accordingly, the laser printer 1 can have an advantage of the belt drive mechanism 40, which is less vibration in power transmission, while meandering of the belt 45 can be reduced. Thus, in the laser printer 1, occurrence of printing failure, which is caused due to banding or jitter generated by oscillation of drive systems, can be reduced. Also, operation failure of the belt drive mechanism 40, which may be caused due to meandering of the belt 45, can be reduced.

Although one embodiment has been described above, the present disclosure is not limited to the above embodiment. Various alterations can be made within the scope not departing from the subject matter of the present disclosure.

For example, the above embodiment includes, but is not limited to, the swelling portion 51 formed on the outer peripheral surface of the driven pulley 43. In one example, the welling portion 51 may be formed on the outer peripheral surface of the drive pulley 42 in addition to the outer peripheral surface of the driven pulley 43. This can reduce meandering of the belt 45 more reliably.

Figure 8:
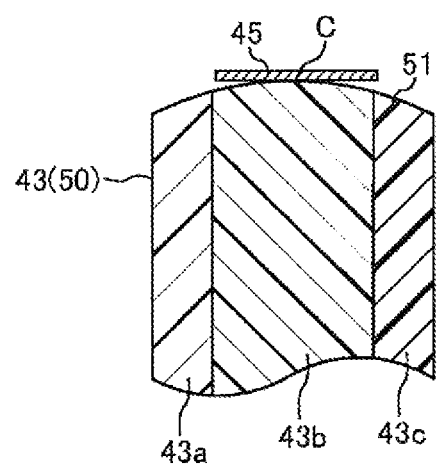
FIG. 8 is a diagram showing a driven pulley according to a fourth aspect.

Further, the above embodiment includes, but is not limited to, the coated portion 52 formed at each part of the swelling portion 51 which has a smaller swelling amount so that the coefficient of linear expansion in the pulley radial direction of the swelling portion 51 differs in the pulley width direction. In one example, the driven pulley 43 may be made from a plurality of (e.g., three) resin materials 43a, 43b, and 43c different from one another in linear expansion coefficient, as shown in FIG. 8. In this case, the resin material 43b corresponds to the part of the swelling portion 51 which has a larger swelling amount, while the resin materials 43a and 43c each correspond to the part of the swelling portion 51 which has a smaller swelling amount. The resin material 43b has a larger linear expansion coefficient than the resin materials 43a and 43c. Further, it is preferable that the resin materials 43a, 43c forming the opposite end parts as each part having a smaller swelling amount have the same linear expansion coefficient in the driven pulley 43 in the first and second embodiments.

Still further, the above embodiment includes, but is not limited to, the driven pulley 43 made from a resin material. The driven pulley 43 may be made from metal, for example.

In addition, the laser printer 1 is discussed as one example of the belt drive apparatus in the above embodiment. However, the belt drive apparatus according to the present disclosure is not limited to the laser printer 1 and may be any of electronic devices that perform belt drive, such as pachinko machines.

What is claimed is:

1. A belt drive mechanism, comprising:
   a plurality of pulleys; and
   a belt made from a metal material and wound around the plurality of pulleys,
   wherein the plurality of pulleys include a drive pulley and a driven pulley,
   the driven pulley has an outer peripheral surface around the entire circumference of which a swelling portion is formed to swell outward in a radial direction of the driven pulley,
   the swelling portion includes a first part having a larger swelling amount and second parts each having a smaller swelling amount, the first part having a larger linear expansion coefficient than each of the second parts,
   the driven pulley is made from a hard resin,
   the swelling portion has a crown shape,
   the crown shape is an arc shape in which the swelling portion swells most outward in the radial direction of the driven pulley at a central part of the swelling portion in a width direction of the outer peripheral surface of the driven pulley and a swelling amount of the swelling portion gradually reduces toward respective opposite end parts from the central part of the swelling portion,
   the first part is the central part of the swelling portion that includes an arc-shaped part,
   the second parts are the respective opposite end parts of the swelling portion that each include an arc-shaped part,
   coated portions to increase thermal resistance are disposed on the respective second parts, and
   the coated portions are line symmetrical with respect to an imaginary line passing through the center part of the swelling portion in the width direction of the driven pulley.

2. A belt drive mechanism according to claim 1, wherein the swelling portion is formed across an entirety of the outer peripheral surface of the driven pulley in the width direction of the driven pulley.

3. A belt drive mechanism according to claim 1, wherein the swelling portion is formed at a part of the outer peripheral surface of the driven pulley in the width direction of the driven pulley.

4. A belt drive mechanism according to claim 1, wherein a width Y of the belt and a width B of the outer peripheral surface of the driven pulley on which the swelling portion is formed satisfy a relational expression, $B > Y \geq 0.5 B$.

5. A belt drive apparatus, comprising:
   a belt drive mechanism according to claim 1.

6. A driven pulley having an outer peripheral surface around which a belt is wound, comprising:
   a swelling portion formed on the outer peripheral surface to swell outward in a radial direction of the driven pulley,
   wherein the swelling portion includes a first part having a larger swelling amount and second parts each having a smaller swelling amount, the first part having a larger linear expansion coefficient than each of the second parts,
   the driven pulley is made from a hard resin,
   the swelling portion has a crown shape,
   the crown shape is an arc shape in which the swelling portion swells most outward in the radial direction of the driven pulley at a central part of the swelling portion in a width direction of the outer peripheral surface of the driven pulley and a swelling amount of the swelling portion gradually reduces toward respective opposite end parts from the central part of the swelling portion,
   the first part is the central part of the swelling portion that includes an arc-shaped part,
   the second parts are the respective opposite end parts of the swelling portion that each include an arc-shaped part,
   coated portions to increase thermal resistance are disposed on the respective second parts, and
   the coated portions are line symmetrical with respect to an imaginary line passing through the center part of the swelling portion in the width direction of the driven pulley.

7. A belt drive mechanism according to claim 1, wherein the coated portion is formed by fluororesin coating on the resin that forms a base material of the driven pulley.

8. A laser printer comprising:
   a belt drive mechanism according to claim 1; and
   an image forming section configured to form an image on a sheet of paper, wherein
   the image forming section includes a photosensitive drum, and
   the belt drive mechanism drives the photosensitive drum.

* * * * *